United States Patent
Callagy et al.

(10) Patent No.: US 10,656,596 B2
(45) Date of Patent: May 19, 2020

(54) VIDEO DISPLAY AND METHOD PROVIDING VISION CORRECTION FOR MULTIPLE VIEWERS

(71) Applicant: Robert Callagy, Fort Lauderdale, FL (US)

(72) Inventors: Robert A. Callagy, Weston, FL (US); James J. Caprio, Weston, FL (US)

(73) Assignee: EagleMae Ventures LLC, Miami, FL (US)

( * ) Notice: Subject to any disclaimer, the term of this patent is extended or adjusted under 35 U.S.C. 154(b) by 863 days.

(21) Appl. No.: 14/664,329

(22) Filed: Mar. 20, 2015

(65) Prior Publication Data

US 2016/0103419 A1  Apr. 14, 2016

Related U.S. Application Data

(60) Provisional application No. 62/061,959, filed on Oct. 9, 2014.

(51) Int. Cl.
| | |
|---|---|
| *G03H 1/00* | (2006.01) |
| *G03H 1/08* | (2006.01) |
| *G03H 1/22* | (2006.01) |
| *G03H 1/26* | (2006.01) |

(52) U.S. Cl.
CPC ......... *G03H 1/0005* (2013.01); *G03H 1/0808* (2013.01); *G03H 1/2294* (2013.01); *G03H 1/265* (2013.01); *G03H 2001/2242* (2013.01); *G03H 2001/2297* (2013.01)

(58) Field of Classification Search
USPC ........................................................ 348/40
See application file for complete search history.

(56) References Cited

U.S. PATENT DOCUMENTS

| | | | |
|---|---|---|---|
| 5,039,182 | A | 8/1991 | Dube et al. |
| 5,548,427 | A | 8/1996 | May |
| 7,400,431 | B2 | 7/2008 | Schwerdtner et al. |
| 7,755,820 | B2 | 7/2010 | Tateishi et al. |
| 2011/0157180 | A1* | 6/2011 | Burger .............. A61B 3/0041 345/428 |

(Continued)

FOREIGN PATENT DOCUMENTS

EP  0 664 495 A1  7/1995

OTHER PUBLICATIONS

Huang et al., "Eyeglasses-free Display: Towards Correcting Visual Aberrations with Computational Light Field Displays". ACM Transaction on Graphics, Aug. 2014.

(Continued)

*Primary Examiner* — Behrooz M Senfi
*Assistant Examiner* — Ana Picon-Feliciano
(74) *Attorney, Agent, or Firm* — Rafael Perez-Pineiro, Esq.; The Brickell IP Group, PLLC

(57) ABSTRACT

A video display system for providing vision correction for multiple users may include a display device having a holographic layer and a vision correction layer. The system may also include a processor coupled to the display device to receive a first prescription corresponding to a first user and a second prescription corresponding to a second user, and to modulate the display device so that the first user at a first angle and the second user at a second angle can view a non-distorted image from the display device.

3 Claims, 8 Drawing Sheets

(56) References Cited

U.S. PATENT DOCUMENTS

| | | | | |
|---|---|---|---|---|
| 2011/0164122 A1* | 7/2011 | Hardacker | ......... | H04N 13/0425 |
| | | | | 348/53 |
| 2012/0062565 A1* | 3/2012 | Fuchs | ..................... | G06T 15/20 |
| | | | | 345/419 |
| 2014/0055692 A1* | 2/2014 | Kroll | ................. | G02F 1/134309 |
| | | | | 349/15 |
| 2014/0195983 A1* | 7/2014 | Du | ......................... | G06F 3/038 |
| | | | | 715/849 |
| 2014/0200079 A1* | 7/2014 | Bathiche | ............ | H04N 13/0402 |
| | | | | 463/32 |
| 2014/0327771 A1* | 11/2014 | Malachowsky | .......... | H04N 7/18 |
| | | | | 348/148 |

OTHER PUBLICATIONS

Maheshwari et al., "Learning Optics using Vision", Biomedical Engineering Center for Visual Science, University of Rochester, Center for Adaptive Optics, Project #42.

Pamplona et al., "Tailored Displays to Compensate for Visual Aberrations", ACM SIGGRAPH 2012, ACM Trans. On Graph. 31(4), pp. 87:1-12.

Raskar et al., "A Self Correcting Projector", IEEE Computer Vision and Pattern Recognition (CVPR), Dec. 2001.

Pamplona, "Interactive Measurements and Tailored Displays for Optical Aberrations of the Human Eye", Universidade Federal Do Rio Grande Do Sul Instituto De Informática Programa De Pós-Graduação Em Computação, Jul. 2012.

\* cited by examiner

VIDEO DISPLAY AND METHOD PROVIDING VISION CORRECTION FOR MULTIPLE VIEWERS

BACKGROUND OF THE INVENTION

Field of the Invention

Embodiments of the present invention generally relate to video displays, and more particularly, to a video display providing vision adjustment or manipulation so that multiple users requiring different vision correction can view a common video image without the need for corrective eye glasses.

Background

Cataracts and refractive errors are the principal causes of loss of visual acuity. Vision impairment is pervasive—more than one billion persons in the world need eyeglasses. The number of persons requiring eyeglasses is expected to increase with the increasing use of smartphones and other electronic gadgets that impose heavy near work on the eyes.

Nearsightedness and farsightedness are common refractive problems. It is easy to get the two confused. Nearsightedness generally refers to a condition where an individual can see objects that are near, like a book, much easier than farther away objects, such as a television screen. Farsightedness is the opposite, where an individual can see objects that are far away, but has trouble seeing up closer objects. In both problems, the image is difficult to see because it is not properly focused on the retina. With nearsightedness, the image becomes focused in front of the retina. With farsightedness, the image is focused behind the retina. The shape of a person's eyeballs also can cause refractive problems.

Cataracts are light scattering proteins that opacify the crystallin in certain regions, deforming the eye's point spread function and reducing retinal illumination. Cataracts can be assessed by back scattering or forward scattering. Back scattering reduces visual acuity by decreasing the amount of light reaching the retina while forward scattering adds noise to the retinal image, decreasing contrast.

To date, at least two types of displays have been proposed to implement vision correction for a single viewer or user so that the user need not wear glasses. One such known proposed display uses measurements of refractive errors and cataract maps to allow the viewer to see a displayed image without needing wearable optical corrections when looking at displays. Such known displays may support nearsightedness, farsightedness, astigmatism, presbyopia (reading glasses), coma, keratoconus, other higher-order aberrations and any type of cataracts. According to EyeNetra, knowledge of the eye conditions allows traditional displays go beyond an individual's visual acuity, presenting images that are in focus even without wearing corrective eyeglasses.

Some known proposed system use hardware that is the same as the hardware used in glasses-free 3D displays (dual stack of LCDs), but in higher resolution. These known displays may be used use in daily tasks where using eye-glasses are unfeasible or inconvenient, such as on head-mounted displays, e-readers, games, etc.

Some known proposed displays enhance visual acuity by decomposing virtual objects and placing the resulting anisotropic pieces into the subject's focal range. Known displays may be tailored, the tailoring process using aberration and scattering maps to account for refractive errors and cataracts. It splits an object's light field into multiple instances that are each in-focus for a given eye subaperture. Their integration onto the retina leads to a quality improvement of perceived images when observing the display with naked eyes. At least one known proposed display system adapts a light field to compensate for an individual's inability to focus. The known display pre-warps the light field to counter act the distortion on the subject's eyes. It is performed in two main steps: (i) pairing light-field rays and retinal positions to associate a raw intensity to each ray; and (ii) normalizing retinal "pixels". Given as input an expected image to be received by the retina and wavefront and cataract maps of the subject's eye, the method produces a light field to be shown on a specified display. The known approaches can be described as the projection of depth-dependent anisotropic patterns according to the spatially-distributed optical aberrations of the eye. The depth-dependent patterns are "anisotropic images" virtually placed at the right point in focus for a given optical power in a section for the cornea. Because these images are placed at multiple depths to create a single image in focus, the known system may be described as including a multi-depth feature. The known method attempts to make sure that the depth-dependent patches are seen only through eye sub-apertures with given refractive powers. Light paths that go through opacities or unpredictable scattering sites, such as cataracts, are avoided. The final result is a light field to be displayed at a given distance from the eye.

Acuity enhancement options range from simple eye-glasses to optical replacements and expensive relays for adaptive optics. They are grouped according to the correction bearer. Eyeglasses with simple, bifocal, and multi-focal lenses, contact lenses, LASIK and cataract surgeries can be used to enhance visual acuity. However, all of them require wearing prosthesis or making incisions in the eye. Multi-focus displays and holograms can enhance visual acuity by projecting images on the subject's range of accommodation. These techniques, however, do not account for the subject's individual variability. One proposed display adjusts itself to compensate the subject's eye refractive errors and avoids light scattering materials on the optical path, such as cataracts. The display is to some extent similar to a still-under-research adaptive-optics-based contact lenses, but applied to the device instead of the eye.

A wavelength-dependent tailoring process could create new insights on the eye accommodation behavior for natural scenes when refractive variations among wavelengths are close to null. Convergence-based 3D displays with multi-focus and tailoring features can lead to a new ultra-resolution vision-enhanced 3D technology. At least one known system however does not determine the distance between the display and the eye and does not work for two different users with different prescriptions to view the same display simultaneously without use of glasses.

Another vision correction display is described in U.S. Patent Pub. No. 20110157180 ("Burger"). The virtual vision correction technique described in that patent application provides for the discovery of a user's vision correction needs and can provide vision correction for people with vision problems by making video displayed adapt to a person's vision correction needs. The vision discovery and display adaptation features of the technique can each be employed separately, or can both be employed in concert.

The virtual vision correction technique disclosed in Burger allows users to state their vision prescription needs. Input video is then processed to appear "20/20" to that person when the processed video is displayed. The technique can employ a representative image (such as an eye chart, for example) to determine a user's vision characteristics. Video processing can then be performed once a user's vision characteristics are obtained to adapt input video to be displayed in accordance with a user's vision correction needs.

The virtual vision correction technique in Burger pre-processes an image or video input for display based on the user's vision correction needs by transforming the input image or video. Instead of using additional after-market lenses placed in front of the video glasses, the technique can just change the video displayed. Furthermore, the technique in an "auto-tune" mode can accommodate changes in vision over time, without the need for additional hardware or additional lens purchases, by prompting a user to provide feedback as to the processed video displayed, using user input to further enhance or correct the image/video displayed to the user. However, the Burger application does not disclose a video display that can be adjusted for simultaneous use by multiple viewers having different vision correction needs.

Therefore, there is a need in the art for a vision correction display that can be adjusted for simultaneous use by multiple viewers having different vision correction needs.

SUMMARY

The following presents a simplified summary of the invention in order to provide a basic understanding of some aspects of the invention. This summary is not an extensive overview of the invention. Rather than specifically identify key or critical elements of the invention or to delineate the scope of the invention, its purpose, inter alia, is to present some concepts of the invention in a simplified form as a prelude to the more detailed description that is presented later.

The present invention allows multiple users with various eye constraints to see any monitor/screen/projection screen in 2D or 3D perspective (TV, computer, laptop, tablet, smartphone, etc.) without the need for eyeglasses or contact lenses.

In one embodiment, the present invention includes a display using a plurality of LCDs that may be used for correction of vision in conjunction with a prescription software module. The display system may also include polarizers, retarders, spatial light modulators ("SLMs"), phased array optics, and rotational modulators to enable the display to cause a holographic effect on the video signal so that it varies depending on the angle of view. In a typical digital holographic display system, data corresponding to different views of an object may be stored and displayed according to the angle of view. In one embodiment, instead of having the system store different perspective views of an object, the perspective views would correspond to different eye prescriptions. The display system may also include a camera for detecting the identity of a user, for example using facial recognition technology, determining an angle of view for the user, and determining a distance of the user from the video display.

In one embodiment, a user enters eye glass prescription information into the system and the system acquires a photo image of the user, either through an integrated camera or by accessing a database of photo images, in order to associate that user with the provided prescription. Multiple users can enter prescriptions and can be identified by the system. Once the system is in use, the system may identify the user, upload eye prescription information, detect the distance and angle of view of the user, and upload the prescription information. Once the prescription information for the user is uploaded, the system is configured so that the LCDs are operated, in conjunction with the filters and SLMs, so that the proper vision corrected video is displayed for that user, depending on the angle of view. When another user is also present, the prescription module and holographic module operate so that video signal is modulated in a manner so that the video is vision corrected for the second user at a second distance from the display and at a second viewing angle.

In one embodiment, an LCD stack is driven by a vision correction signal corresponding to a first user and a polarizer and other holographic hardware is operated so that the LCD video is polarized such that the first user sitting at a first angle can view the corrected video while the display signal is at least partially blocked at a second angle corresponding to a second user. At a subsequent cycle or clock cycle, the LCD stack is driven by a vision correction signal corresponding to the second user and the holographic-enabling elements are operated such that the LCD video is polarized in a manner that allows the second user sitting at a second angle to view the corrected video while the display signal is at least partially blocked at a first angle corresponding to a first user. The cycle repeats until either the second or the first user leaves the vicinity of the display.

The following description and the accompanying drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following description of the invention when considered in conjunction with the drawings.

DETAILED DESCRIPTION OF THE DISCLOSURE

Figure 1A:
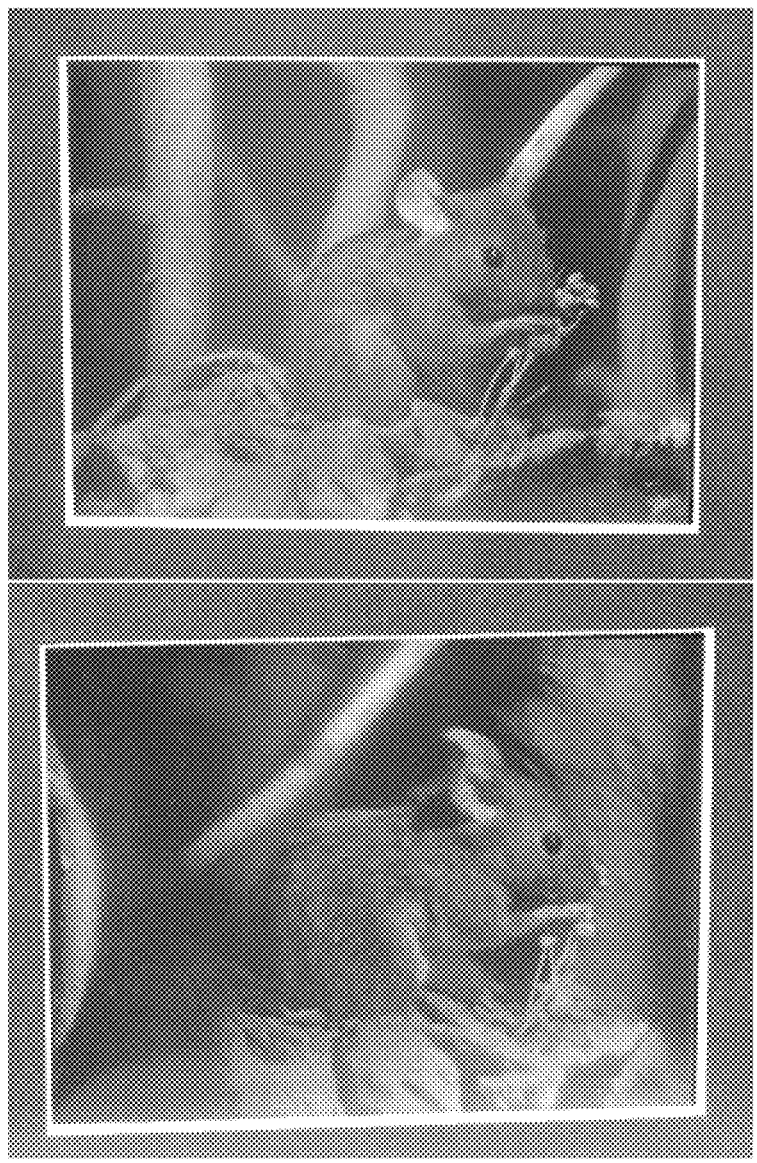
FIG. 1A illustrates a 2D hologram found in the prior art.

The following detailed description and the appended drawings describe and illustrate exemplary embodiments of the invention solely for the purpose of enabling one of ordinary skill in the relevant art to make and use the invention. As such, the detailed description and illustration of these embodiments are purely exemplary in nature and are in no way intended to limit the scope of the invention, or its protection, in any manner. It should also be understood that the drawings are not to scale and in certain instances details have been omitted, which are not necessary for an understanding of the present invention, such as conventional details of fabrication and assembly.

One embodiment of a video display system for providing vision correction for multiple users, in accordance with the disclosure, may include a display device having a holographic layer and a vision correction layer. The system may also include a processor coupled to the display device to receive a first prescription corresponding to a first user and a second prescription corresponding to a second user and to modulate the display device so that the first user at a first angle and the second user at a second angle can perceive a non-distorted image from the display device.

In some embodiments, the system may also include a holographic module configured to modulate the holographic layer to at least partially block the non-distorted image to the second user while, at the same time, allow the first user to view the non-distorted image. The first prescription and the second prescription may correspond to different eye deficiencies. The system may also include a camera coupled to the processor. In additional embodiments, the display device may include a plurality of liquid crystal displays.

A method of displaying vision corrected video for multiple users may include the step of receiving, via a processor, a first prescription corresponding to a first user and a second prescription corresponding to a second user. The method may also include the step of modulating a display device having a vision correction layer and a holographic layer, through use of the processor, so that the first user at a first angle and the second user at a second angle can view a non-distorted image from the display device.

In another embodiment, the method may also include determining an angle of view for the first and second users via a camera coupled to the processor. The method may further provide the angle of view for the first and second users to a holographic module to modulate the holographic layer.

In an additional embodiment, the method may include determining a distance of the first and second users via a camera coupled to the processor. The method may include providing the distance of the first and second users to a vision correction module to modulate the vision correction layer.

In a further embodiment, the method may include detecting an identity of the first and second users via a camera coupled to the processor. The method may also include providing the identity of the first and second users to a vision correction module and a holographic module.

FIG. 1A illustrates a 2D hologram found in the prior art. The upper part of FIG. 1A represents a front view of a mouse as seen by a person looking at a screen or display from a first angle. The bottom part of FIG. 1A represents a side view of the mouse as seen by a person looking at a screen or display from a second angle.

Figure 1B:
FIGS. 1B and 1C illustrate how a viewer would see a variation in the displayed image depending on the angle of view.
Figure 1B:
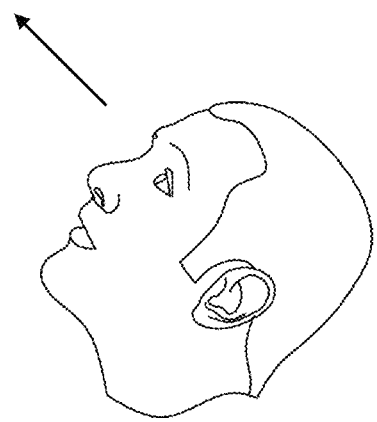
Figure 1C:
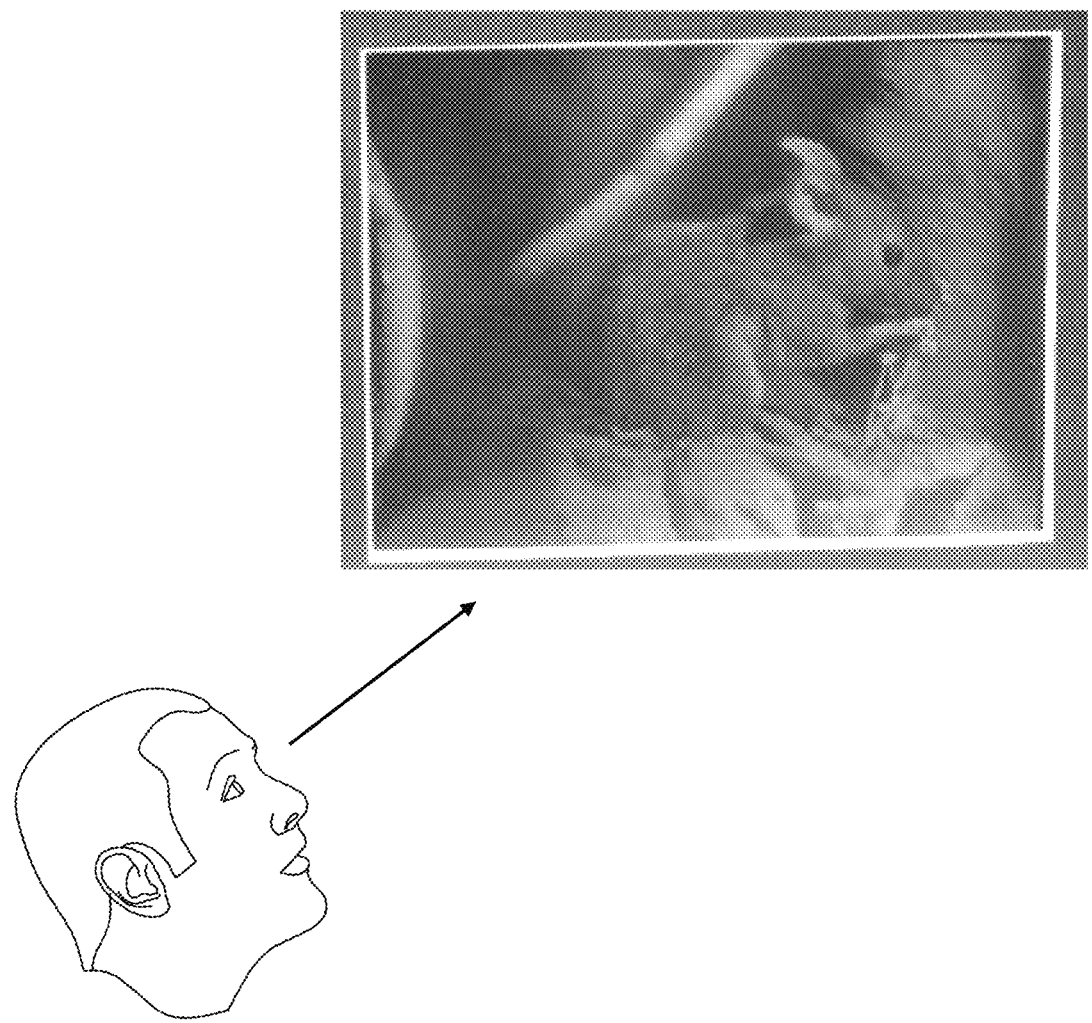

FIGS. 1B and 1C illustrate how a viewer would see a variation in the displayed image depending on the angle of view. A person of ordinary skill in the art will recognize that display systems may use polarizers, retarders, spatial light modulators ("SLMs"), phased array optics, and rotational modulators in combination with LCD or OLED panels to enable a display system to cause a holographic effect on a displayed image so that it varies depending on the viewing angle. The following references, as well as any other references cited in the present application, are incorporated herein by reference in their entireties. The following references disclose systems that may be used to generate digital holograms: Lehtimaki et al., "Displaying Digital Holograms Of Real-World Objects On A Mobile Device Using Tilt-Based Interaction," IEEE 2010; Tateishit et al., "Two-dimensional modulation method for hologram recording and hologram apparatus with encoder for driving SLM displaying boundary portion," U.S. Pat. No. 7,755,820; May, "Switchable holographic apparatus," U.S. Pat. No. 5,548,427; Dube et al., "Storing information in dual holographic images," U.S. Pat. No. 5,039,182; and Schwerdtner, "Method for encoding video holograms for holographically reconstructing a scene," U.S. Pat. No. 7,400,431.

Figure 2:
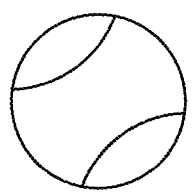
FIG. 2 corresponds to a source still image signal before being processed by the system disclosed herein.
Figure 3:
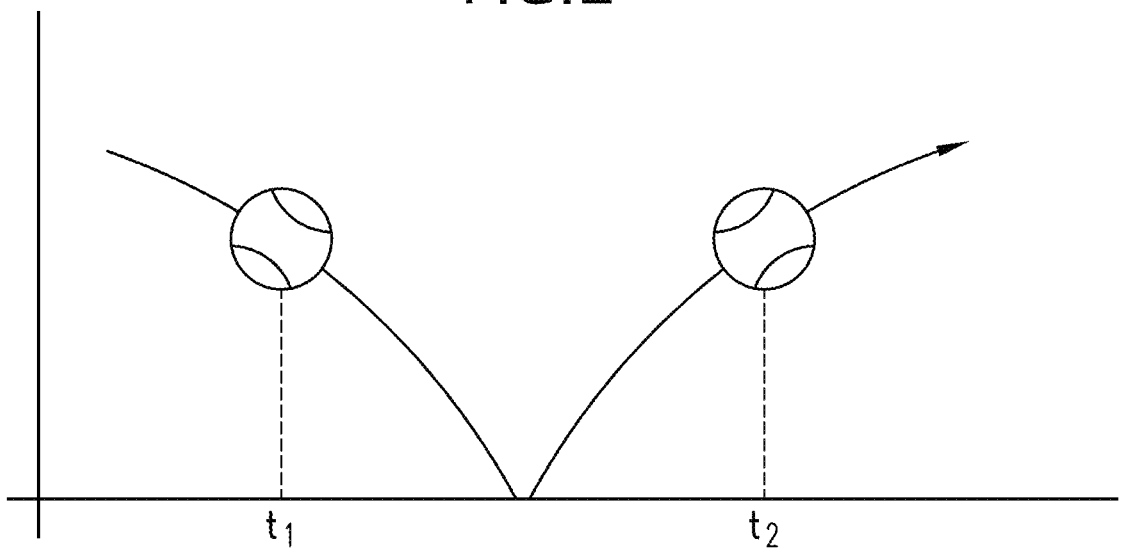
FIG. 3 corresponds to a source video signal before being processed by the system disclosed herein.

FIG. 2 corresponds to a source still image signal before being processed by the system disclosed herein. When a conventional monitor or display is fed with the source image signal, it will display a clear image of a baseball. Likewise, FIG. 3 corresponds to a source video signal before being processed by the system disclosed herein. When a conventional monitor or display is fed with the source video signal, it will display a clear video of a baseball in movement. For ease of discussion, FIG. 3 and other subsequent figures may include a time line of animation, which in FIG. 3 is represented by two discrete points in time t1 and t2. That is, at a time t1 (e.g., once second after the start of a scene), a viewer would see the ball displayed in the position illustrated at t1, and at a time t2 (e.g. one second after t1), a viewer would see the ball displayed in the position illustrated at a time t2.

Figure 4:
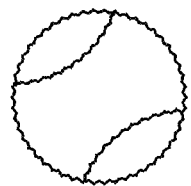
FIG. 4 is an image corresponding to an output source image signal after being processed for vision correction based on a prescription for a first user.
Figure 9:
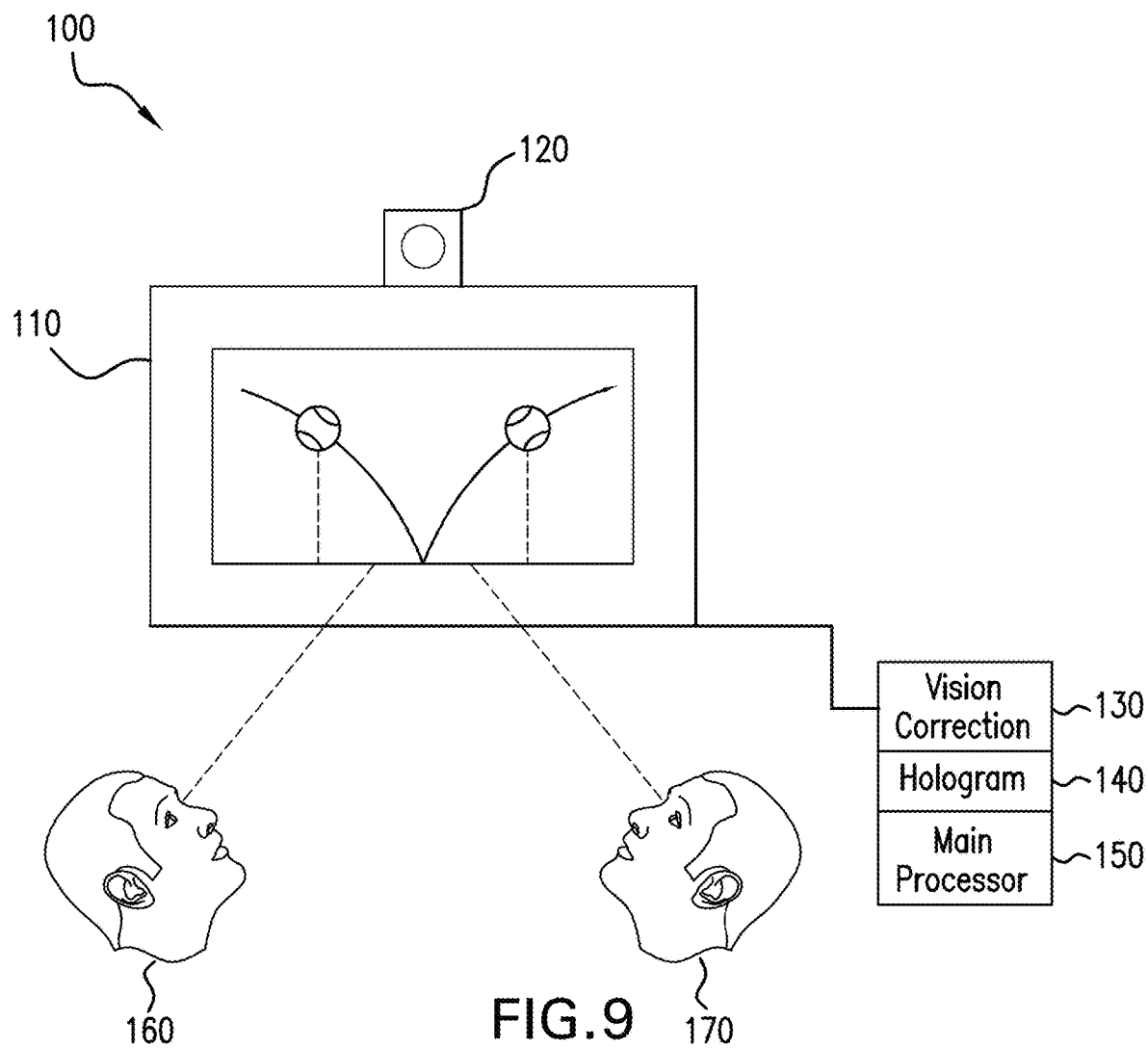
FIG. 9 illustrates a high-level view of the system in operation.

FIG. 4 is an image corresponding to an output source image signal after being processed for vision correction based on a prescription for a first user (p1) 160 (see FIG. 9).

Figure 5:
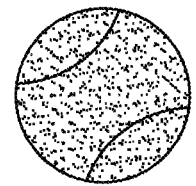
FIG. 5 is an image corresponding to an output source image signal after being processed for vision correction based on a prescription for a second user.

FIG. 5 is an image corresponding to an output source image signal after being processed for vision correction based on a prescription for a second user (p2) 170 (see FIG. 9).

Figure 6:
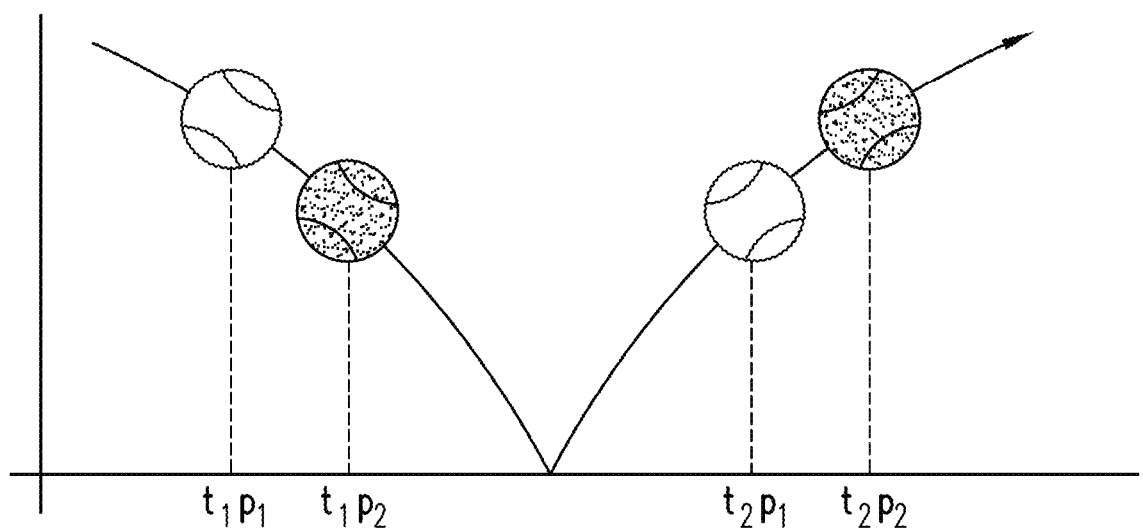
FIG. 6 illustrates a video corresponding to an output source video signal after the source video signal is processed for vision correction based on inputted or provided vision prescriptions for the first and second users.

FIG. 6 illustrates a video corresponding to an output source video signal after the source video signal is processed for vision correction based on inputted or provided vision prescriptions for the first and second users 160, 170. In one embodiment, the vision correction module 130 (see FIG. 9) will process the source video signal in parallel according to the prescriptions of the first and second users 160, 170, and sequentially alternate between the signal corresponding to the vision correction for the first user and the signal corresponding to the vision correction for the second user. The output of the vision correction module 130 may then be the sequential alternation of processed signals for vision correction and may be synchronized with a holographic module 140 (see FIG. 9) to obtain the desired effect. For example, at time t1p1 the holographic module 140 may cause the display of the video for the first user 160 at a first angle while at the same time will cause an interference effect to be displayed at a second angle corresponding to the second user 170 so that the second user 170 will not be exposed to the video at time t1$p$1 and at the angle of view for that second user 170. The first user 160 will, accordingly, only see the p1 image at time point t1. Likewise, at time t1$p$2 the holographic module 140 may cause the display of the video for the second user 170 at a second angle while at the same time will cause an interference effect to be displayed at a first angle corresponding to the first user 160 so that the first user 160 will not be exposed to the video at time t1$p$2 at an angle of view for the first user 160. Because these sequences take place so rapidly, neither user will experience a blackout video sequence and will only view their respective images p1, p2 associated with their viewing angle, which practically may be their seating position with respect to a display.

Figure 7A:
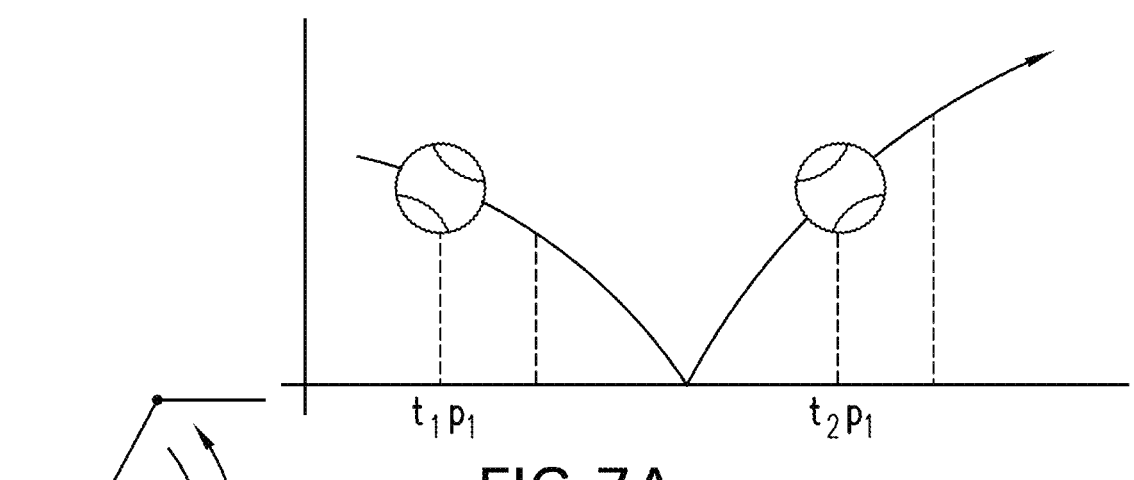
FIG. 7A corresponds to the signal produced by the application of the visual correction module after additional processing by the holographic module for a first angle of view and first prescription corresponding to the first user.
Figure 7B:
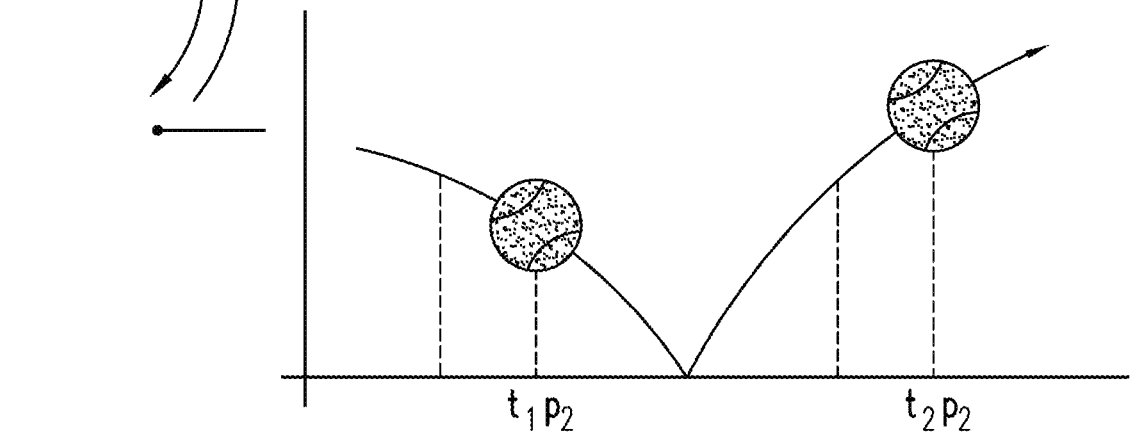
FIG. 7B corresponds to the signal produced by the application of the visual correction module after additional processing by the holographic module for a second angle of view and second prescription corresponding to the second user.

FIGS. 7A and 7B further illustrate the concept explained above. FIG. 7A corresponds to the signal produced by the application of the visual correction module 130 after additional processing by the holographic module 140 for a first angle of view and first prescription corresponding to the first user 160. FIG. 7B corresponds to the signal produced by the application of the visual correction module 130 after additional processing by the holographic module 140 for a second angle of view and second prescription corresponding to the second user 170.

Figure 8A:
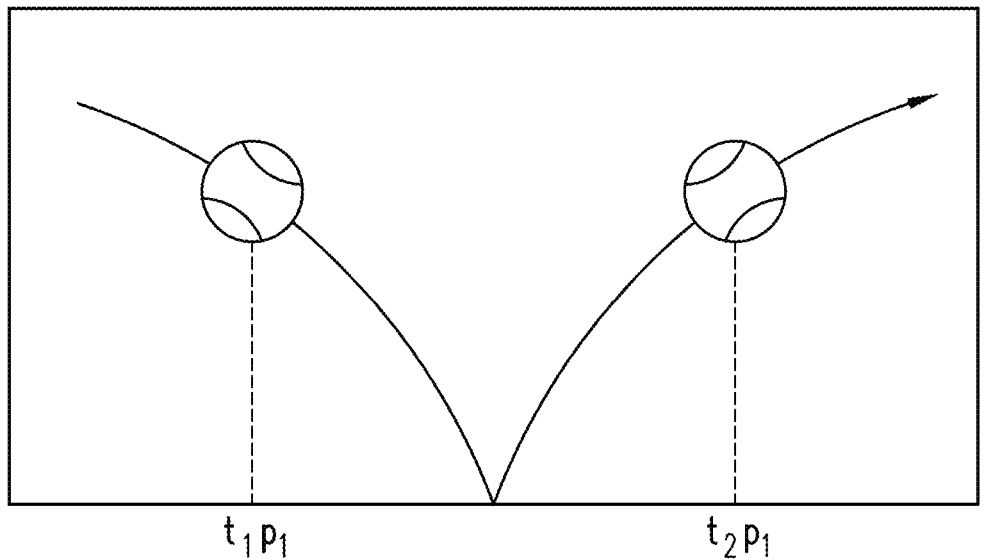
FIGS. 8A-B illustrate the video corresponding to the signals described in connection with FIGS. 7A-B as perceived by the first user and the second user corresponding with their respective first and second viewing angles.
Figure 8B:
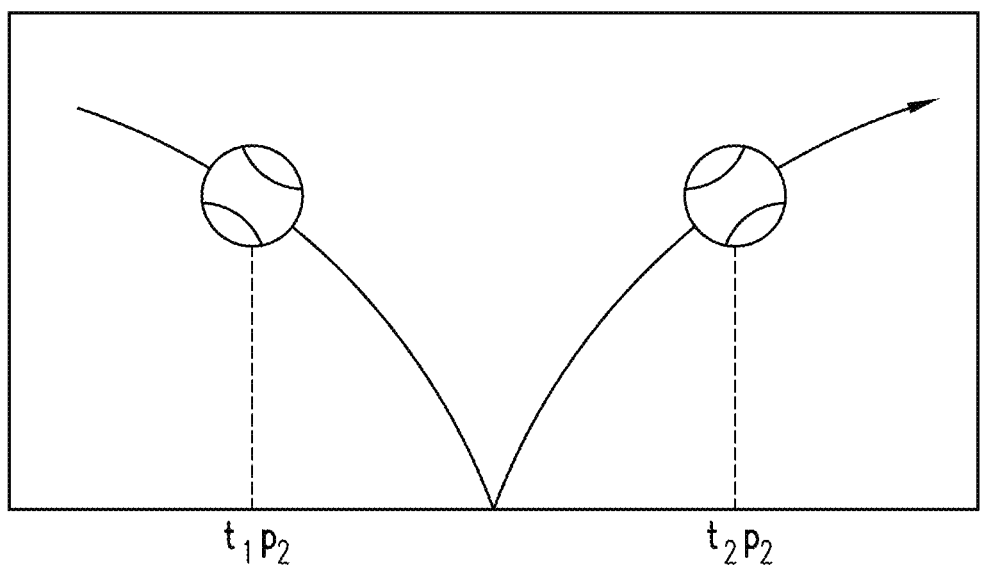

FIGS. 8A-B illustrate the video corresponding to the signals described in connection with FIGS. 7A-B as perceived by the first user 160 and the second user 170 corresponding with their respective first and second viewing angles.

FIG. 9 illustrates a high-level view of the system 100 in operation. An embodiment of the system 100 may include a display 110, a camera 120, the vision correction module 130, the holographic module 140, and a processor 150. The display 110 may include a plurality of LCDs or other type of displays known to those of ordinary skill in the art, for example, televisions, tablet monitors, computer monitors, smart phones, movie projectors, or the like. The display 100 may have a holographic layer and a vision correction layer. The camera 120 may detect the identity of the first user 160 and second user 170, for example, in conjunction with facial recognition technology. The camera 120 may also determine an angle of view for the users, determine a distance of the users from the display, and other functions known to those of skill in the art. The processor 150 may be coupled to the display 110. The processor 150 may receive prescription information corresponding to the users. The processor 150 may also modulate the display 110 to that the users can view the image from the display 110.

Figure 10:
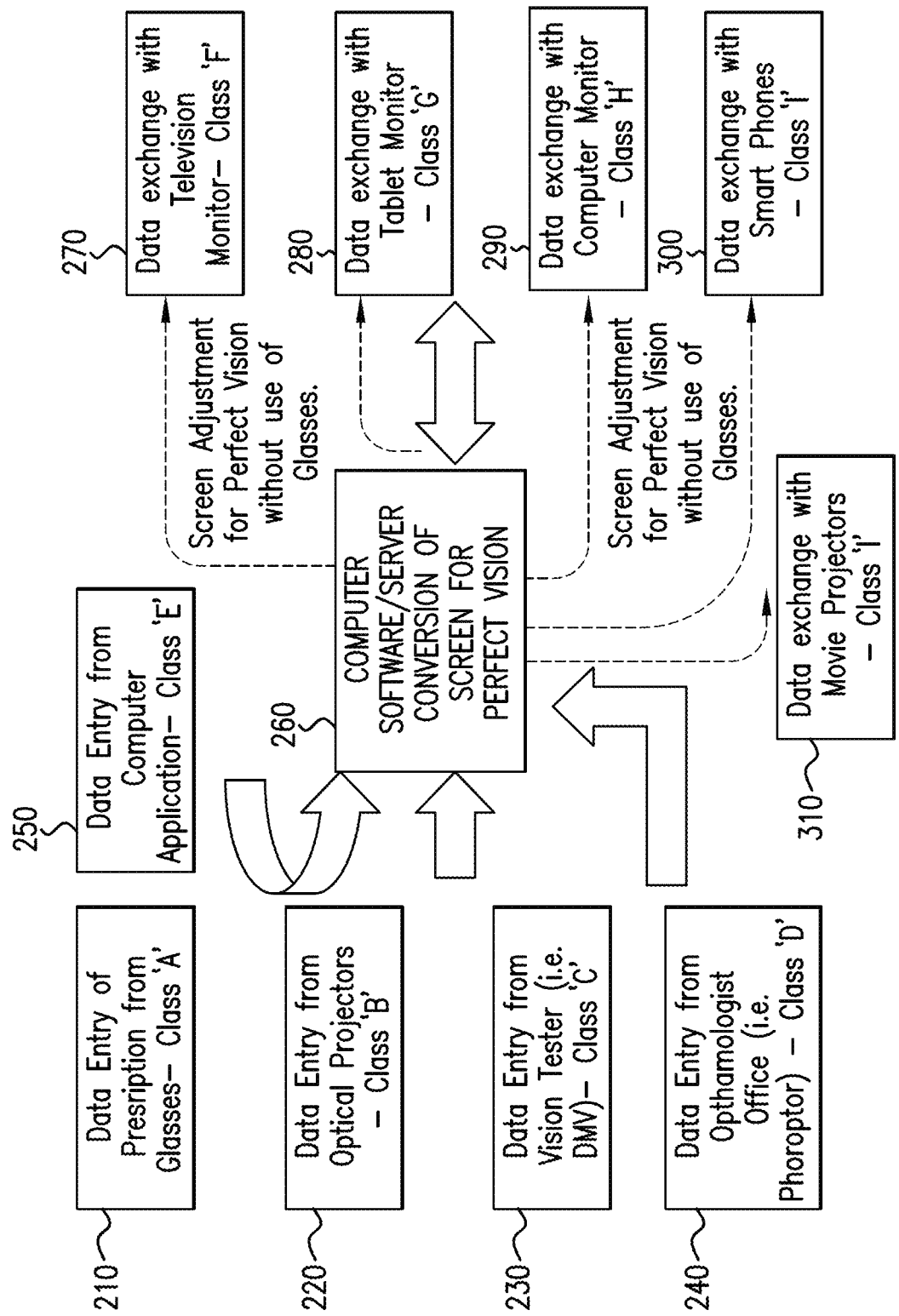
FIG. 10 illustrates the different methods that may be used to upload vision correction/user prescription information into the system.

FIG. 10 illustrates different methods that may be used to upload vision correction/user prescription information into the system 100. Vision correction/user prescription information may be uploaded into to the display or a remote server in communication with the display by a user using a glasses prescription 210. In other embodiments, vision correction/user prescription information corresponding to eye deficiencies may be uploaded into the system 100, for example, from optical projectors 220, a vision tester at a DMV 230, measuring equipment at an ophthalmologist office such as a phoroptor 240, a computer application 250, or other vision correction/user prescription information measurement devices known to those of skill in the art.

Computer software 260 on the display or server may convert the source video signal based on the vision correction/user prescription information and provide the corrected video signal to the display device. Display devices, such as a television monitor 270, a tablet monitor 280, a computer monitor 290, a smart phone 300, movie projector 310, and the like, may upload display information into the remote server, such as screen dimensions, distance and angle of the first 160 and second 170 users, and other information known to those of skill in the art. The display devices may also measure and upload vision correction/user prescription information data into the system 100.

In use, the computer software/server 260 may continuously correct the source video signal through multiple iterations. For example, the display device may measure the vision correction/user prescription information and upload it to a remote server. Computer software 260 may make a first conversion of the source video signal and provide the vision corrected video signal to the display device. The first 160 and second 170 users may be prompted to input additional data corresponding to vision preferences and the computer software 260 may make a second conversion of the video signal. This process may continue until the user is satisfied with the video. Alternatively, the display device may measure and automatically upload information, such as user distance, lighting, and the like, so that the video signal is continuously being corrected.

While the above embodiments describe displays of first and second images p1, p2, it should be understood and appreciated that substantially more than two images may be simultaneously displayed. Accordingly, in one embodiment substantially more than two viewers may simultaneously view corrected images on a display, in accordance with embodiments of the disclosure. For instance, in one embodiment a viewer may enter a movie theater configured with multi-view display screens as described herein. Upon selecting a seat, the viewer may provide prescription data associated with their sitting position. In accordance with embodiments described herein, the user may then view a prescription adjusted display while the system interferes with other prescription adjusted displays provided for other users watching the display for alternative viewing angles.

LIST OF REFERENCES 100 system
110 display
120 camera
130 vision correction module
140 holographic module
150 processor
160 first user
170 second user
210 data entry from prescription glasses
220 data entry from optical projectors
230 data entry from vision tester
240 data entry from opthamologist office
250 data entry from computer application
260 computer software/server conversion
270 data exchange with television
280 data exchange with tablet monitor
290 data exchange with computer monitor
300 data exchange with smart phones
310 data exchange with movie projector

What is claimed:
1. A multi-view display screen system comprising:
a TV display device for providing vision correction for multiple users without use of eyeglasses and for measuring room lighting where the users are located, the display device comprising
a vision correction layer, and a holographic layer overlaid on said vision correction layer and in closer proximity to viewers of the display device than the vision correction layer;

a camera aimed at viewers of said display device and coupled to a processor for conducting facial recognition of and detecting the identity of a first user and a second user, determining a first distance between said first identified user and the display device and a second distance between said second identified user and the display device, and determining a first angle of view for the first identified user and a second angle of view for the second identified user, wherein said processor associates the first identified user with a first preloaded eye prescription and said first distance and associates the second identified user with a second preloaded eye prescription and said second distance;

a vision correction module for receiving a source video signal, replicating the source video signal into two or more source video signals, processing a first replicated source video signal and a second replicated source video signal in parallel, wherein said first replicated source video signal is processed through multiple iterations to generate a first corrected video signal based on said first distance, additional data corresponding to vision preferences of said first identified user, first preloaded eye prescription, and said measured lighting, wherein said second replicated source video signal is processed through multiple iterations to generate a second corrected video signal based on said second distance, additional data corresponding to vision preferences of said second identified user, second preloaded eye prescription, and said measured lighting, wherein said vision correction module outputs the first corrected video signal to the vision correction layer which generates a first corrected video at a time t1, and outputs the second corrected video signal to the vision correction layer which generates a second corrected video at a time t2; and a holographic module synchronized with the vision correction module and configured to modulate the holographic layer at said time t1 based on said first angle and said first user identity to allow the first user to view the first corrected video while at the same time generating an adjustable desired level of interference effect to be displayed at said second angle corresponding to the second user to block in an adjustable manner and to at least partially block the first corrected video from view by the second user, and modulate the holographic layer at said time t2 based on said second angle and said second user identity to allow the second user to view the second corrected video while at the same time generating an adjustable desired level of interference effect to be displayed at said first angle corresponding to the first user to block in an adjustable manner and to at least partially block the second corrected video from view by the first user.

2. The multi-view display screen system of claim 1, wherein the first prescription and second prescription correspond to different eye deficiencies.

3. The multi-view display screen system of claim 1, wherein the TV display device comprises a plurality of liquid crystal displays.

* * * * *